United States Patent [19]

Lockwood, Jr.

[11] 4,402,340
[45] Sep. 6, 1983

[54] PRESSURE-RESPONSIVE SHUT-OFF VALVE

[76] Inventor: Hanford N. Lockwood, Jr., 2222 Alameda de las Pulgas, San Mateo, Calif. 94403

[21] Appl. No.: 259,724

[22] Filed: May 1, 1981

[51] Int. Cl.³ ............................................. F16K 15/18
[52] U.S. Cl. ................... 137/493.7; 137/322; 137/516.29; 141/21; 222/3; 251/149.8; 251/210; 251/272; 251/335 A
[58] Field of Search ................... 137/322, 493, 493.7, 137/516.29; 141/18, 21; 222/3; 251/83, 210, 149.8

[56] References Cited

U.S. PATENT DOCUMENTS

| | | | |
|---|---|---|---|
| 1,595,786 | 8/1926 | Johnson | 251/210 |
| 2,527,359 | 10/1950 | Guth | 222/3 |
| 2,645,241 | 7/1953 | Riede | 141/18 |
| 2,661,925 | 12/1953 | Barkelew | 251/210 |
| 2,861,569 | 11/1958 | Emerson | 251/83 X |
| 2,927,767 | 3/1960 | Ray | 251/210 |
| 2,931,385 | 4/1960 | Carlisle | 137/516.29 |
| 3,292,895 | 12/1966 | Leger | 251/83 |
| 3,307,597 | 3/1967 | Shugarman | 141/18 |
| 3,645,286 | 2/1972 | Follett | 222/3 X |
| 3,930,517 | 1/1976 | Gagala | 222/3 X |
| 4,210,168 | 7/1980 | Yonezawa | 141/18 X |

FOREIGN PATENT DOCUMENTS

| | | | |
|---|---|---|---|
| 1123634 | 2/1962 | Fed. Rep. of Germany | 137/516.29 |
| 417060 | 1/1947 | Italy | 251/210 |

Primary Examiner—Robert G. Nilson

[57] ABSTRACT

A combined manual and pressure-responsive shut-off valve, intended particularly for use with high pressure gas cylinders, is disclosed. The valve includes a single seat and a single plug, the plug having a first sealing surface for closing against a low residual pressure in the cylinder and a second sealing surface for closing against a relatively high cylinder pressure. A pressure-responsive actuator engages the first sealing surface against the seat whenever pressure in the cylinder falls below a predetermined minimum. A manual actuator engages the second sealing surface against the valve seat to close against a wide range of pressures. The seat is specifically configured to conform to the plug. Means are provided for refilling the cylinder without removing the combined valve. In one embodiment, a special tool is provided for opening the pressure-responsive actuator. In a second embodiment, a bypass check valve is provided to allow gas to flow into the cylinder.

10 Claims, 17 Drawing Figures

PRESSURE-RESPONSIVE SHUT-OFF VALVE

BACKGROUND OF THE INVENTION

1. Field of the Invention

The present invention relates generally to shut-off valves, and, more particularly, it relates to a shut-off valve which automatically blocks flow from a gas cylinder when the pressure in the cylinder falls below a predetermined level.

2. Description of the Prior Art

When the pressure in a gas cylinder is depleted, the cylinder must be refilled. It is desirable to leave a small residual pressure in the cylinder to prevent its contamination before it is refilled by the gas supplier. Gas cylinders are typically provided with a manual shut-off valve at their outlet, and when the pressure in the gas cylinder falls below the minimum acceptable level, the user could close the valve to prevent the residual pressure from being lost.

Normally, however, the manual shut-off valve on such cylinders is left open by the user and the residual gas pressure is lost. The cylinder must then be cleaned and purged prior to refilling in order to meet the purity specifications for the particular gas. The cleaning of the cylinder is an extra step which increases the cost of the refilling.

It is thus desirable to provide an automatic shut-off means which will seal the outlet of the cylinder whenever the pressure therein falls below a predetermined level. Heretofore, this has been accomplished by providing a check valve in addition to the manual valve. The check valve is typically located in the outlet port of the manual shut-off valve. Such check valves are disclosed in U.S. Pat. No. 3,384,133 to Gordon and U.S. Pat. No. 4,210,168 to Yonezawa.

The use of a check valve separate from the mechanism of the manual shut-off valve is undesirable for two reasons. First, it increases the complexity and cost of the valve. Second, shut-off valves for gas cylinders must be made small enough to fit beneath a protective cover which is standard to the gas cylinder industry. The provision of a second valve mechanism within the shut-off valve body makes it more difficult to produce the compact valve required.

The inclusion of a separate check valve, however, has been necessitated by the broad range of pressures over which the cylinder operates. The manual valve must be capable of sealing against cylinder pressures in excess of 3,000 PSI while the automatic shut-off of the cylinder occurs with an internal pressure in the range from approximately 10 to 50 PSI. The combination of valve plug and seat required to shut off against very high pressures is unsuitable for automatic actuation by a spring set to shut-off against low pressures. That is, a valve plug having a hard seating surface, as required by high pressure operation, will not seal properly with a low seating force such as that provided by a spring set to seat against 15 PSI. On the other hand, the soft seat required for low pressure operation will deform and fail when subjected to high pressure. The problem is exacerbated because the check valve on the cylinder must allow no essential leakage since the cylinders will typically be shipped and stored for long periods prior to refilling.

Thus, while it would be desirable to provide a single valve plug and seat for both the manual and the automatic shut-off of a high pressure gas cylinder, such a combination is not found in the prior art.

Valves having a single valve plug and seat and dual actuating means are found in other applications, however. U.S. Pat. No. 3,211,175 to Replogle discloses a combination regulating the check valve. An automatic actuator may be adjusted to provide the desired outlet pressure from the gas cylinder. An integral check valve is provided to allow the gas cylinder to be filled without having to remove the gas regulator from the cylinder. The valve disclosed is provided in addition to a manual shut-off valve and therefore need not shut off against a wide range of pressures.

A combination metering, check and shut-off valve is disclosed in U.S. Pat. No. 3,420,493 to Kraft. The valve described therein is a conventional needle valve having a spring-loaded valve plug. A threshold flow of fluid through the valve holds the plug fully open in relation to an adjustable valve stem. Flow below this threshold level allows the valve plug to spring closed regardless of the position of the valve stem. Again, this valve would be incapable of sealing against a wide range of pressures.

Thus, while it is known to combine more than one function in a single valve plug and seat combination, they have not been adapted for for both the manual and automatic shut-off of a high pressure gas cylinder.

SUMMARY OF THE INVENTION

The present invention overcomes the above-discussed shortcomings of the prior art by providing a specially designed valve plug which seals tightly against low inlet pressures when closed by a small force, and also seals tightly against high pressures when closed by a much larger force. The use of such a valve plug allows the construction of a combined shut-off and check valve for use on pressured gas cylinders utilizing only a single valve plug and a single valve seat. The valve shuts off automatically when the pressure in the cylinder falls below a predetermined level and allows substantially no leakage over extended time periods.

Generally speaking, the valve of the present invention comprises a valve body having an inlet port, an outlet port and a passageway therebetween. The inlet port is typically mounted to receive gas directly from the gas cylinder, while the outlet port is typically connected to a regulating valve. A valve seat defines a portion of the passageway. A valve plug is reciprocably mounted in the valve body and manual means such as a handle is provided for urging the valve plug against the valve seat. Additionally, pressure-responsive means such as a spring is provided for urging the valve plug against the valve seat whenever the pressure in the gas cylinder falls below a predetermined level.

The valve plug includes at least two separate sealing surfaces. The first sealing surface is chosen so that it will form a tight seal with a relatively low actuating force, such as that provided by the spring. The actuating force provided is sufficient to maintain the seal against the residual pressure in the gas cylinder. The second sealing surface seals tightly against the valve seat when a relatively large force is applied on the valve plug. Such a force may be provided by the handle. The seal provided by the second sealing surface will withstand the entire range of pressures experienced by the valve. When the second sealing surface is engaged, the first sealing surface is further deformed without being damaged or reaching its elastic limit.

The spring is typically adjustable and acts directly against the plug, urging the plug toward the seat. When the pressure of the fluid flowing against the valve plug falls below the predetermined level, the force of the spring exceeds the fluid pressure and the check valve closes. Because of this balancing of forces, it is necessary that the valve plug be able to seal against the valve seat with a relatively small seating force. With the configuration of the preferred embodiment, the valve plug will seal against the residual pressure in the gas cylinder with the seating force of as little as approximately 2.5 pounds.

The present invention also provides means which enable the cylinder to be refilled without having to remove the combined shut-off and check valve. In one embodiment of the invention, a tool is provided to physically bias the valve plug open against the seating force supplied by the spring. The tool is constructed to mate with the valve plug so that it is difficult to tamper therewith, thus preventing unauthorized persons from accidentally bleeding gas from the cylinder which could lead to its contamination. Further, the tool can be provided with an axial passageway for the flow of gases to refill the cylinder. This helps ensure that the valve will not be opened before a supply of gas for refilling is available.

An alternate embodiment of the invention includes a bypass check valve in the valve body for filling. The second check valve provides an alternate flow path and opens whenever the pressure at the discharge port exceeds the pressure in the gas cylinder. The provision of a second check valve is appropriate when minimum preparation for refilling the cylinder is desired.

DESCRIPTION OF THE PREFERRED EMBODIMENT

Referring to FIGS. 1–6, a valve 20 comprises a valve body 22 having an inlet port 24, an outlet port 26 (FIG. 2), an access opening 28 and a pressure relief port 30. The lower portion 32 of the valve body is threaded and received in an outlet connector of a gas cylinder (not shown). Both the access opening 28 and the pressure relief port 30 are normally blocked, as described hereinafter, and gas from the cylinder normally flows from the inlet port 24 to the outlet port 26.

The inlet port 24 leads to a vertical passage 36 which terminates at a cylindrical chamber 38 formed in the interior of the valve body 22. The chamber 38 houses a charging-valve subassembly 40 whose structure and function will be described in detail hereinafter. An annular passageway 42 between the charging-valve subassembly 40 and the wall of chamber 38 allows gas emerging from the cylinder to bypass the charging-valve subassembly at all times.

Figure 1:
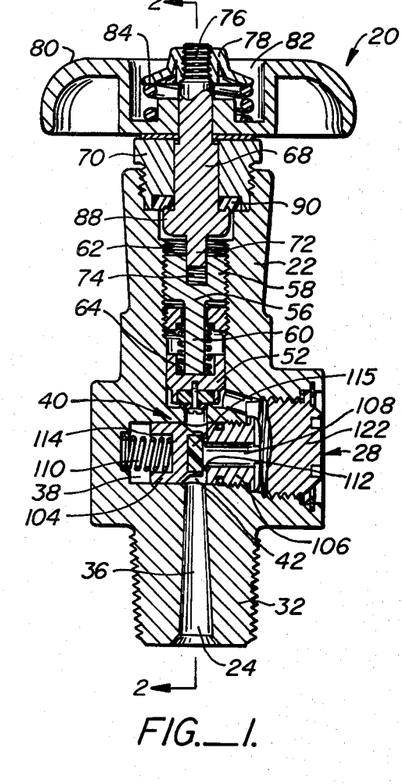
FIG. 1 is an elevational view of a first embodiment of the present invention shown in section.
Figure 2:
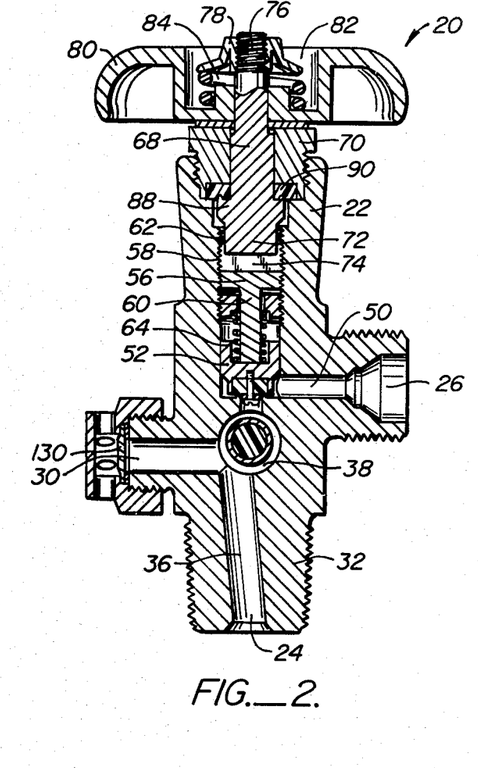
FIG. 2 is an elevational view taken along line 2—2 of FIG. 1.
Figure 3:
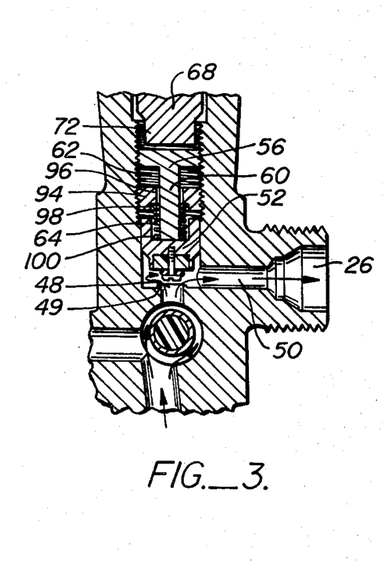
FIG. 3 is a detail view showing a portion of the view of FIG. 2 and illustrating the valve plug in an open configuration.
Figure 4:
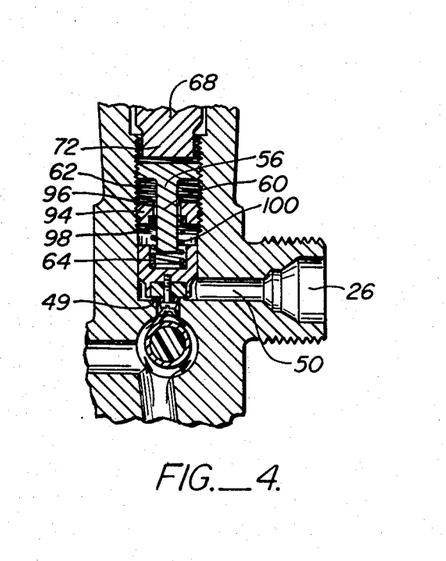
FIG. 4 is a view similar to FIG. 3 illustrating the valve plug in a closed configuration.

A valve seat 48 comprising a raised, annular lip 49 formed in the valve body 22 (best illustrated in FIGS. 3, 4 and 5) is disposed in the passageway from the top of chamber 38 to a horizontal passage 50 (FIGS. 2–4 and 6) which communicates directly with the outlet port 26. A valve plug 52 engages the seat 48, as illustrated in FIGS 1, 2 and 4, to block flow from the inlet port 24 to the outlet port 26. The preferred construction of both the valve seat 48 and plug 52 will be described in detail in connection with FIGS. 12, 13 and 14, hereinafter. Both a manual means and an automatic means for actuating the valve plug 52 are provided.

The manual actuating means includes a stem 56 comprising a threaded cylindrical body 58 and a cylindrical shaft 60 extending downward therefrom. The stem body 58 is threadably received in a vertical chamber 62 disposed above the valve seat 48. Rotation of the valve stem 56 causes it to vertically translate within the valve body 22. The shaft 60 of the valve stem is received in a cup-shaped depression 64 in the valve plug 52. By moving the valve stem downward the valve plug can be seated against the valve seat 48.

A post 68 is held in a lock nut 70 which is threaded into the upper portion of the valve body 22. One end 72 of the post is keyed to fit in a slot 74 formed in the valve stem 56. A retaining nut 78 is attached to the other end 76 of the post 68.

A handle or handwheel 80 is operably connected to the post 68 to permit manual rotation thereof. An annular recess 82 formed in the handle 80 receives one end of a spring 84, the other end of which is disposed against the lower radial face of the retaining nut 78. The spring 84 provides a biasing force which urges an annular flange 88 of the post 68 against a gasket 90 placed against the lower face of the lock nut 70. The seating of the flange 88 against the gasket 90 prevents gas leakage around the post 68. Additionally, the gasket 90 seats against the valve body and prevent leakage between the outside perimeter of the lock nut 70 and the valve body.

Rotation of handle 80 causes post 56 to rotate in a like direction. With right-hand threading on both the stem body 58 and the chamber 62, clockwise rotation of the handle causes the valve stem 56 to lower within the chamber 62, while counterclockwise rotation causes it to raise.

The manual actuator is shown in a "closed" configuration in FIGS. 1 and 2, the valve stem 56 is in its fully lowered position with the shaft 60 disposed against the valve plug 52, shutting the valve plug 52 against the valve seat 48. As shown in FIGS. 3 and 4, the manual actuator is open and valve stem 56 is in a raised position.

The pressure-responsive actuator for the valve plug 52 is best illustrated in FIGS. 3 and 4. A retaining ring 94 is threadably received in the lower end of chamber 62. The ring 94 has a central bore 96 therethrough to allow passage of the shaft 60 of the valve stem 56. An annular recess 98 formed in the lower end of the central bore 96 receives one end of a spring 100 therein. The opposite end of the spring 100 is received by the cup-shaped depression 64 in the valve plug 52. The retaining ring does not rotate with the valve stem 56 and its vertical position in the chamber does not change during operation of the valve. The spring 100 thus provides a downward force against the valve plug 52 which is uninfluenced by the position of the manual actuator. The spring force (and thus the automatic closing pressure) may be adjusted by moving the retaining ring 94 upward or downward in chamber 62. The manual actuator, of course, must be removed to allow access to the retaining ring 94. The closing pressure will typically be in the range from 10 to 50 psi.

With the manual actuator in its fully open position, as shown in FIGS. 3 and 4, the valve plug 52 will be free to open or close under the influence of pressure-responsive actuator. When the pressure in the gas cylinder exceeds the predetermined minimum, the gas pressure will hold the plug open as illustrated in FIG. 3. However, when the gas pressure is below said minimum, the spring force closes the valve plug, as illustrated in FIG. 4.

The spring force required to close the plug 52 against the seat 48 just exceeds the force of the gas pressure against the plug. Thus, if the area of the plug is one-quarter in.$^2$ and the shut-off pressure is 16 psi, the spring force must be slightly greater than 4 lbs. To close the same valve plug against a fully charged gas cylinder, however, requires the manual actuator to provide a seating force in excess of 750 lbs. (when the cylinder pressure is 3000 psi). This wide variation in seating forces requires a specially designed valve plug, as discussed more fully hereinafter.

Figure 5:
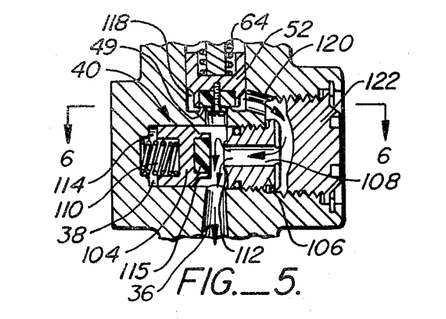
FIG. 5 is a detail view of the valve of FIG. 1 illustrating the charging check valve in an open configuration.

Referring to FIGS. 1 and 5, the charging-valve subassembly 40 includes a valve plug 104, a valve seat 106 having an axial bore 108 therethrough and a spring 110. The valve seat 106 is secured at the right hand side (as viewed in FIG. 1) of the chamber 38 and includes an annular lip 112 which mates with the valve plug 104. One end of the spring 110 is received in a cup-shaped recess 114 at the rear of the valve plug 104 and the other end of the spring is disposed against the left hand end of chamber 38.

Figure 6:
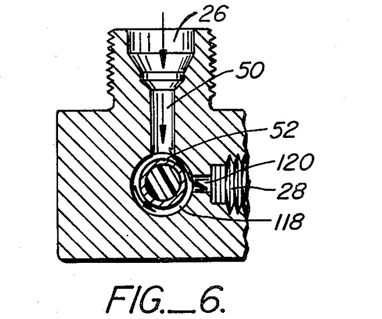
FIG. 6 is a sectional view taken along line 6—6 of FIG. 5.

To refill the gas cylinder, pressurized gas is introduced at the outlet port 26 and flows inward through the horizontal passage 50 (FIGS. 5 and 6). The incoming gas must flow through an annular passage 118 around the plug 52 which is manually closed. At the right hand side of passage 118 (as viewed in FIG. 6), a bore 120 allows the incoming gas to flow into the access opening 28. The gas then flows through axial bore 108 in valve seat 106 and, if sufficient pressure is present, will open the valve plug 104 against the seating force of spring 110. The gas is then able to flow downward through passage 36 into the gas cylinder.

An elastomeric disc 115 inserted in the right end of plug 104 (as viewed in FIGS. 1 and 5) engages the lip 112 to seal the axial bore 108 when the cylinder is not being recharged. Since the recharging pressure is high (equal to the final cylinder pressure), the seating force provided by spring 110 can be substantial. The disc 115 will, therefore, normally be formed from a hard elastomer to withstand the high seating force. Moreover, the plug 104 need only include a single seating surface since it will be actuated by only the single seating force.

The access opening 28 is normally blocked by a plug 122 which may be removed when it is desired to have access to the charging-valve subassembly 40. A space between the rear (to the left as viewed in FIG. 5) of plug 122 and valve seat 106 remains to provide a flow passage for gas entering through port 120. The pressure relief port 30 is provided with a rupture disc 130 (FIG. 2) which is adapted to burst when the pressure in the cylinder exceeds a predetermined safe level.

FIG. 1 illustrates the charging-valve subassembly 40 in its closed configuration while FIGS. 5 and 6 illustrates the same subassembly in its open configuration. The arrows in FIGS. 5 and 6 illustrate the flow path of the recharging gas.

FIGS. 7 through 11 illustrate an alternate embodiment for the valve of the present invention. A valve 150 comprises a valve body 152 having an inlet port 154, an outlet port 156 and a pressure relief port 160. The construction of the valve 150 is similar to that of the valve 20 except that the valve 150 is not provided with a charging-valve subassembly to bypass the closed valve plug. Instead, a tool 180 (FIGS. 10 and 11) is provided for opening the valve plug to allow gas to enter the cylinder.

Figure 7:
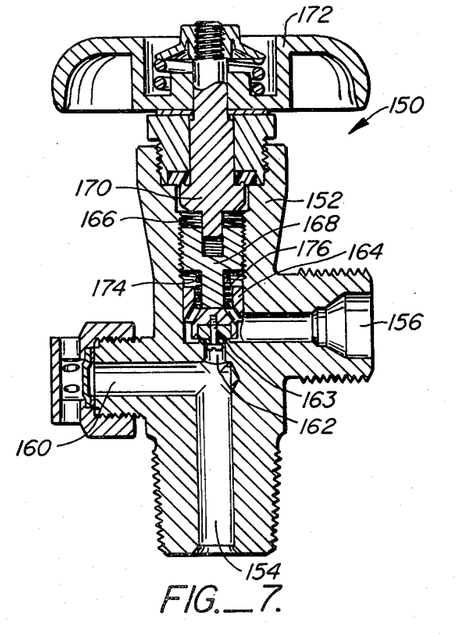
FIG. 7 is an elevational view of a second embodiment of the present invention shown in section.

The valve 150 includes a single valve seat 162 comprising an annular lip 163 formed in the valve body 152 and defining a portion of the passageway from the valve inlet 154 to the valve outlet 156. A valve plug 164 is reciprocally mounted within a chamber 166 formed above the valve seat 162 and actuated by both a manual actuator and the pressure-responsive actuator.

The manual actuator for the valve plug 164 includes a valve stem 168 threadably mounted in a chamber 166, a post 170 and a handle 172. The construction and interaction of the stem 168, the post 170 and the handle 172 are identical to those of the valve 20 described hereinbefore. Thus, rotation of the handle 172 moves the valve plug 164 toward the valve seat 162 to manually close the valve 150. Reference may be made to earlier portions of the specification for a more detailed description.

The construction of the pressure-responsive actuator of valve 150 differs somewhat from that of valve 20, described hereinbefore, including only a spring 174 disposed at its upper end against the valve stem 168 and held at its lower end in a cup-shaped recess 176 in the top of plug 164. The retaining ring 94 is not included in the alternate embodiment of the invention. Since the valve stem 164 moves up and down under the influence of the handle 172, the spring force against the valve plug 164 will vary. Such variation, in turn, affects the set point at which the valve will automatically close when the pressure in the gas cylinder is depleted. However, when the manual actuator be fully opened the upper end of the spring 174 is at a fixed location within the chamber 166. This forces a constant and, at the same time, the lowest possible set point for the pressure-response actuator.

Figure 8:
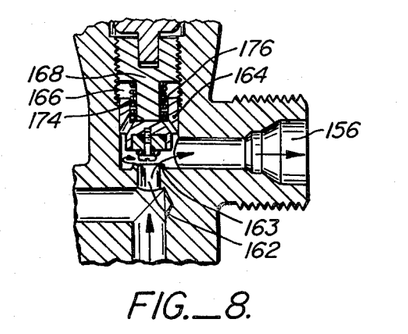
FIG. 8 is a detail view of the valve of FIG. 7 illustrating the valve plug in an open configuration.

FIG. 8 illustrates the valve plug 164 of valve 150 in its normal operative position. The valve stem 168 is fully raised and its upper end is disposed against the lower end of post 170. As stated hereinbefore, this insures that spring 174 will be under the proper tension corresponding to the desired shut off pressure for the gas cylinder. The arrows of FIG. 8 indicate the flow path of gases emerging from the cylinder.

Figure 9:
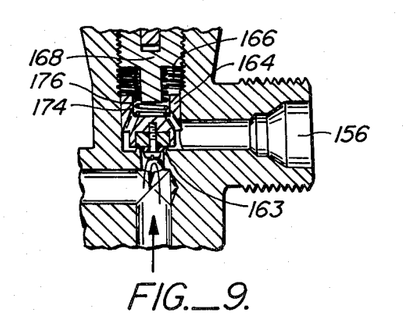
FIG. 9 is a view similar to FIG. 8 illustrating the valve plug in a closed configuration.

FIG. 9 illustrates the valve 150 with the manual actuating means open and the automatic actuating means closed. This is the position the valve assumes when the pressure in the gas cylinder has been depleted below the predetermined minimum level.

Figures 10, 13, 15:
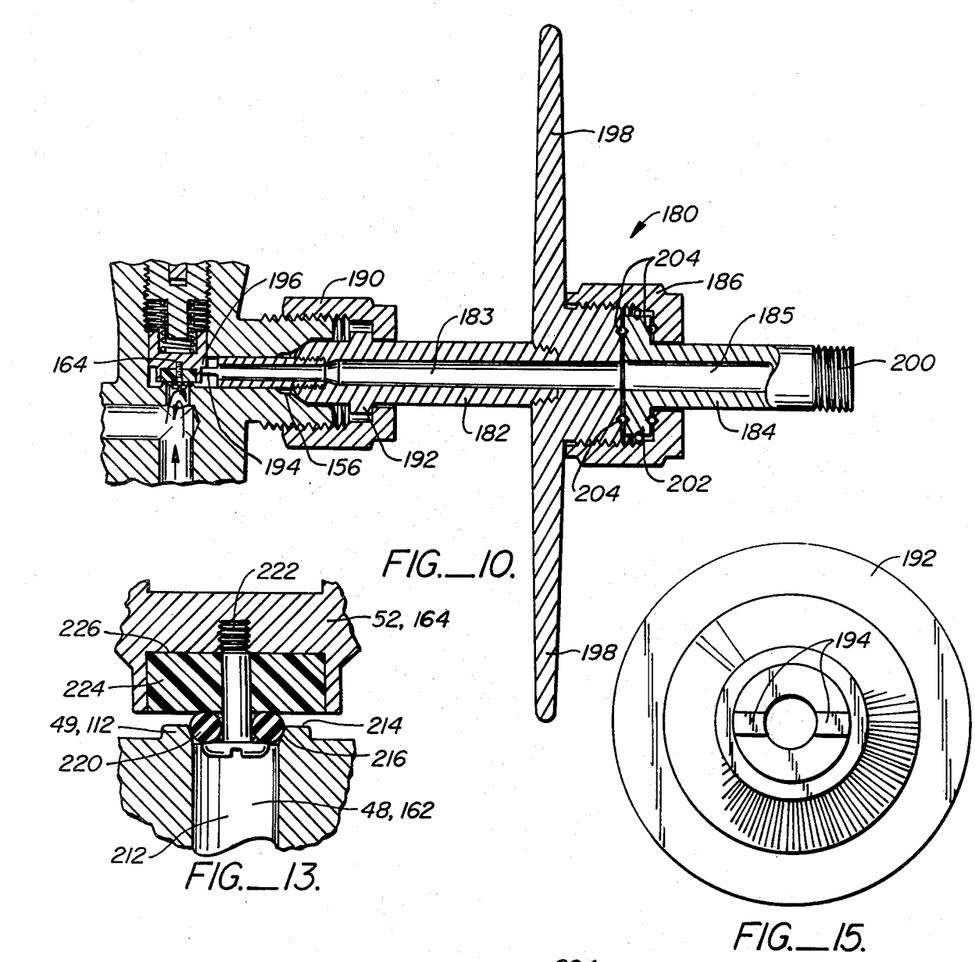
FIG. 10 is an elevational view of a refilling tool of the present invention shown in section.
FIG. 13 is a detail view similar to that of FIG. 12 and illustrates the soft elastomeric surface of the valve plug closed against the valve seat.
FIG. 15 is a front-end view of the refilling tool illustrating the forks which engage the valve plug.
Figure 11:
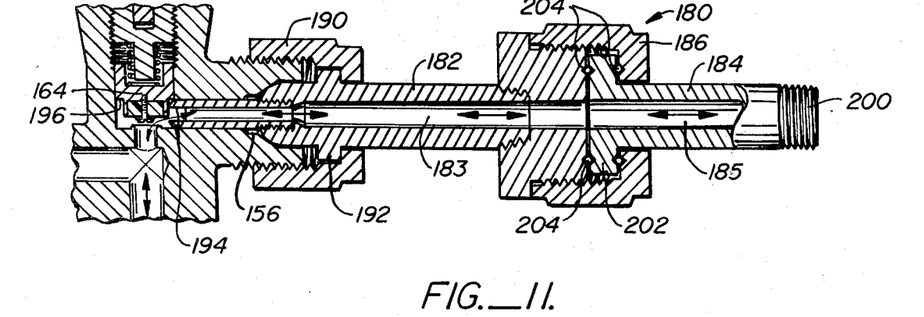
FIG. 11 is a view similar to that of FIG. 10 and illustrates the refilling tool rotated in order to allow recharging of the cylinder.

Referring now to FIGS. 10 and 11, the tool 180 used for refilling the gas cylinder comprises a main shaft 182 having an axial bore 183 therethrough, a coupling cylinder 184 also having an axial bore 185 therethrough and a retaining nut 186 which secures the cylinder 184 to the rear (to the right as viewed in FIGS. 10 and 11) of the main shaft 182. The axial bores 183, 185 are aligned to define a passage for the incoming flow of gas to the gas cylinder. The tool 180 may also be used to bleed the residual gas held in the cylinder of the pressure-responsive actuator.

The forward end of the main shaft 182 has a shape complementary to that of the outlet port 156. A threaded union 190 rotatably engages a flange 192 on the main shaft and is received on the male threads of the outlet port 156. A Teflon washer (not shown) is provided between the rear radial face of flange 192 and the union 190 to allow rotation of the main shaft 182 when the tool 180 is mounted on the valve. In this way, the tool 180 can be screwed onto the valve 150.

Referring now to FIGS. 10, 11 and 15, the forward end of the main shaft 182 terminates in a pair of forks 194 which insert beneath a shoulder 196 on the valve plug 164, as illustrated in FIG. 10. By turning the main shaft 182 in either direction, the forks 194 engage the shoulder 196 and force the valve plug upward to provide a passage for refilling (or emptying) the gas cylinder. The position after rotation is illustrated in FIG. 11. Arms 198 project radially from the shaft 182 and allow the shaft to be rotated. The arms 198 may be removed from the main shaft 182 to allow the removal of the union 190.

Male threads are provided at the rear of the coupling cylinder 184 for connection to a source of gas (typically a flexible hose) for refilling the cylinder. A forward flange 202 on the coupling cylinder 184 is rotatably received between the rear of the main shaft and the retaining nut 186. "O" rings 204 are provided, both as bearings and to seal the connection between the main shaft and the coupling cylinder 184 against leakage.

Figure 12:
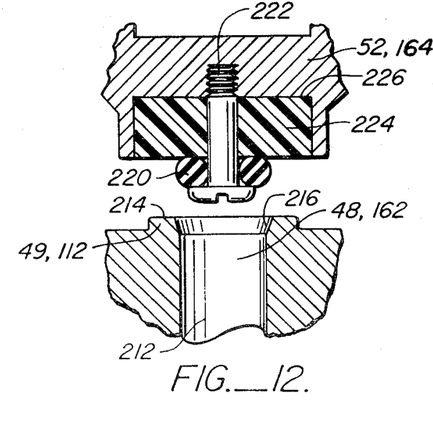
FIG. 12 is a detail view of a valve plug and valve seat constructed according to the present invention.
Figure 14:
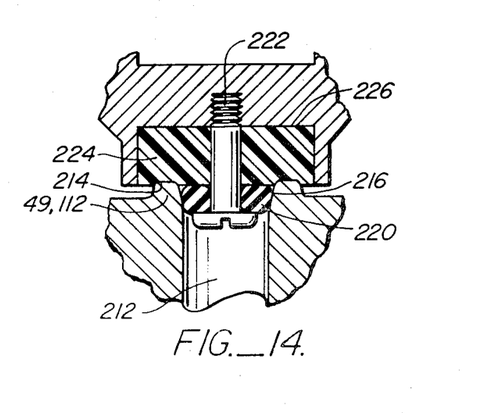
FIG. 14 is a detail view similar to that of FIG. 12 and illustrates the hard elastomeric surface of the valve plug closed against the valve seat.

The detailed construction of the valve plug and the valve seat of the present invention is illustrated in FIGS. 12, 13 and 14. The constructions of the valve plugs 52 and 168 and valve seats 48 and 162 in both valves 20, 150 are identical and will be described only once. Reference numbers to both valves 20, 150 will be included in the drawings and in the specification.

The valve seat 48, 162 is preferably machined in the valve body 22, 152 and includes a raised annular lip 49, 112 disposed about a cylindrical bore 212 which forms a portion of the passageway therethrough. The annular lip 49, 112 includes both a flat, radial surface 214 and an inner chamfered surface 216 which defines a conical transition between the radial surface 214 and the cylindrical bore 212.

The valve plug 52, 164 includes both a soft elastomeric surface for engaging the valve seat 48, 162 to retain the residual pressure in the cylinder and a hard elastomeric surface to seal against the whole range of possible pressures. The soft elastomeric surface is typically an "O" ring 220 secured at the bottom of the plug 52, 168 by a retaining screw 222. While the "O" ring illustrated in FIGS. 12-14 has a circular cross-section, "O" rings having other than circular cross-sections may be substituted. The hard elastomeric surface is typically a disc-shaped insert 224 held in a recess 226 formed in the bottom of the plug.

When the plug is actuated by the pressure-responsive actuator, the "O" ring 220 engages the chamfered surface 216 on the annular lip 49, 112, as illustrated in FIG. 13. The relatively small seating force provided by the pressure-responsive actuator is sufficient to seal the "O" ring 220 against the seating surface 216 of valve seat 48, 162 so that no leakage from the cylinder occurs. To assure a tight seal the "O" ring should have a Rockwell hardness in the range from about R49 to R103. A preferred material for the "O" ring is buna "N" rubber having a Rockwell hardness of approximately R60.

To seal the valve against high pressure, hand wheel 80, 172 of the manual actuator is turned to move the insert 224 against the lip 49, 112, as illustrated in FIG. 14 and generate the required force which assures a tight seal even under high gas pressure. The lip 49, 112, forms an indentation in the insert to supply a tight seal. The "O" ring is too soft to seal against high pressure and although further deformed during seating of high pressure seal, it does not exceed its elastic limits. Also, the compressive deformation of the "O" ring seal reduces the potential for "O" ring failure due to high pressure gas permeating the soft "O" ring causing blow out. The insert 224 should be relatively hard so as to minimize indentations in it from the lip when the applied force is large. Preferably, it has a Rockwell hardness in the range from about R103 to R120 and it is constructed of a material which resists being extended under relatively high pressures. A presently preferred material is nylon.

The "O" ring 220 will seal against pressures up to approximately 1,000 to 1,500 PSI. Thus, when the cylinder pressure drops to this level and the manual actuator is shut-off, it will in fact be the "O" ring that is sealing and not the insert 224. The "O" ring material should therefore be chosen to deform within elastic limits and seal at pressures in this range and at the same time not be damages when the high pressure seal is engaged.

Figure 16:
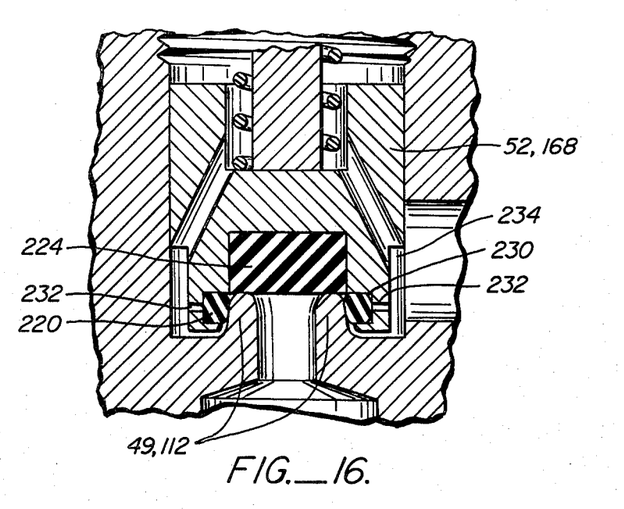
FIG. 16 is a detail view of an alternate embodiment of the valve plug.

An alternate valve plug design, which prevents the potential for "blow out" of the "O" ring 220, is illustrated in FIG. 16. The valve seat, including the annular lip 49, 112 remains the same as in the previous embodiments. The valve plug 52, 168, however, is modified to hold the "O" ring 220 in contact with the outer perimeter of the annular lip. Since the "O" ring is confined on three sides in a recess 230 defined in the lower end of the plug 52, 168, it is less likely to dislose from the recess 230 by the rapid drop in pressure of any gas which may have permeated the elastomers. Moreover, the insert 224 now forms the primary seal whenever the manual actuator is closed and the "O"]ring, which is not deformed beyond its elastic limit only sees the valve outlet pressure. Holes 232 are provided to vent the pressure on the "O" ring recess 230 when the valve is first opened. A shoulder 234 is provided about the plug 52, 168 so that the refilling tool 180 may engage the plug to open it.

Figure 17:
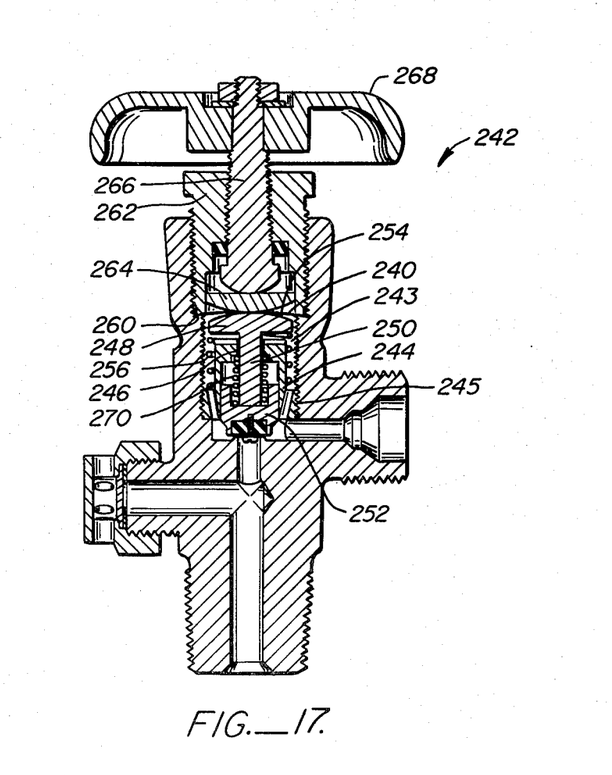
FIG. 17 is an elevational view of a third embodiment of the present invention shown in section.

Referring now to FIG. 17, a diaphragm 240 may be provided for zero leakage applications such as combustible or toxic gases. Provision of the diaphragm requires that certain changes be made in both the manual and pressure-responsive actuators, as described hereinbelow.

A valve body 242 is substantially the same as that illustrated in FIG. 7 in connection with the second embodiment. A diaphragm, however, may be included with either embodiment. A chamber 243 receives a cup 244 having a shoulder 245 threadably engaging the chamber wall and a hole 246 at the top end thereof. A post 248 has a shaft 250 extending through the hole 246 and engaging a plug 252, which may be of any of the designs discussed hereinbefore. The particular plug illustrated is similar to those depicted in FIGS. 12–14, with a diameter corresponding to the internal diameter of the cup 244.

The upper end of the post 248 is defined by an arcuate surface 254 extending substantially across the chamber 243. The post 248 is urged upward by a spring 256 whose lower end is disposed against the shoulder 245 of the cup 244.

The diaphragm 240 is secured at its periphery between a shoulder 260 formed in the valve body and an insert 262 which screws into the body. The diaphragm is free to move up and down with the post 248 while maintaining a tight seal which prevents the escape of gases from the cylinder.

The post 248 is driven by a disc 264 which engages the arcuate surface 254 through the diaphragm 240. In turn, the disc 264 is operated by a valve stem 266 which is connected directly to a handle 268. Since the contact area between the stem and the disc is less than that between the disc and the diaphragm, the disc will not rotate as the stem turns. This reduces the chance of damaging the diaphragm.

A spring 270 engaging the cup 244 at its upper end and the plug at its lower end provides automatic actuation of the valve whenever the pressure in the cylinder falls below a predetermined level in manner similar to the embodiments described hereinbefore.

Although the best modes contemplated for carrying out the present invention have been herein shown and described, it will be apparent that modification and variation may be made without departing from what is regarded to be the subject matter of the invention.

What is claimed is:

1. A shut-off valve for use with a pressurized gas cylinder, said shut-off valve comprising:
 a body having an inlet port, an outlet port, and a passageway therebetween;
 a seat disposed in the passageway;
 a plug having a soft surface for sealing against the seat to contain a relatively low pressure at the inlet port and a hard surface for sealing against the seat to contain a relatively high pressure at the inlet port, said soft and hard surfaces being axially spaced apart so that the soft surface engages the seat before the hard surface engages the seat;
 pressure-responsive means for automatically engaging the plug against the seat with a first preselected force so that only the soft sealing surface engages the seat whenever the pressure in the cylinder falls below a predetermined level; and,
 manual means for engaging the plug against the seat with a second preselected force greater than the first preselected force so that the hard sealing surface engages the seat.

2. A shut-off valve as in claim 1, wherein the valve seat includes a first seating surface engaging the first sealing surface on the plug and a second seating surface for engaging the second sealing surface on the plug.

3. A shut-off valve as in claim 2, wherein the first and second mating surfaces on the valve seat are axially spaced apart, whereby the soft sealing surface engages the first mating surface and the hard sealing surface engages the second mating surface when the valve plug is fully disposed against the valve seat.

4. A shut-off valve as in claim 1, wherein the first sealing surface is a relatively soft elastomeric "O" ring.

5. A shut-off valve as in claim 4, wherein the "O" ring has a Rockwell hardness in the range from R49 to R103.

6. A shut-off valve as in claim 1, wherein the second sealing surface is a relatively hard insert.

7. A shut-off valve as in claim 6, wherein the insert has a Rockwell hardness in the range from R108 to R120.

8. A pressure-responsive check valve for use with a pressurized gas cylinder, said check valve comprising:
 a body having a passageway through which gas flows from an inlet to an outlet;
 an annular shoulder surrounding the passageway, said shoulder including a generally chamfered mating surface which depends from the shoulder;
 a plug for sealing against the shoulder, said plug being reciprocally mounted within the passageway and including a relatively soft surface aligned with the chamfered surface and a relatively hard surface aligned with the shoulder;
 first means for moving the plug to engage the soft surface of the plug with the chamfered mating surface of the valve seat when the pressure at the inlet has decreased to a predetermined set point so that the flow of gas through the passageway is shut off when the pressure at the inlet reaches the set point, said first means comprising a spring which at one end engages the plug and at the other end is fixed within the passageway so that said spring applies a constant closing force on the plug; and
 second means which is independent of the first means for moving the plug to engage the hard surface of the plug with the shoulder so that the flow of gas through the passgeway can be shut off against pressure at the inlet which exceeds the set point;
 whereby the relatively soft surface assures a seal at low gas pressure and the relatively hard surface assures a seal at high pressure.

9. A pressure-responsive check valve system for use with a pressurized gas cylinder, said check valve system comprising:
 a check valve which includes:
 a valve body having an inlet and an outlet and a passage therebetween;
 a valve seat which defines a portion of the passageway;
 a valve plug reciprocably mounted within the valve body, said plug having a shoulder and being capable of engaging the valve seat to block the flow of gas through the passageway;
 means for urging the valve plug against the valve seat to shut off the flow of gas in the passageway, said means operating automatically when the pressure at the inlet falls below a predetermined level and capable of being manually operated regardless of the pressure at the inlet; and a tool for bypassing the flow of gas from the outlet to the inlet for filling the gas cylinder with gas where the pressure at the inlet is below the predetermined level, the tool including:

a shaft having a passageway therethrough;

a member at one end of the shaft for engaging the shoulder on the valve plugs, said member being arranged eccentrically with respect to the axis of the shaft;

means for rotating the shaft about its axis;

means for securing the shaft to the outlet and for sealing the resulting junction against leakage of gas; and means for connecting the shaft to a source of gas for refilling the cylinder; whereby rotation of the shaft disengages the valve plug from the valve seat.

10. A pressure-responsive check valve system as in claim 9, wherein the means for bypassing includes a second passageway having a second seat and second plug therein, said second plug being arranged to open only when the pressure at the valve outlet exceeds the pressure at the inlet.

* * * * *